UNITED STATES PATENT OFFICE.

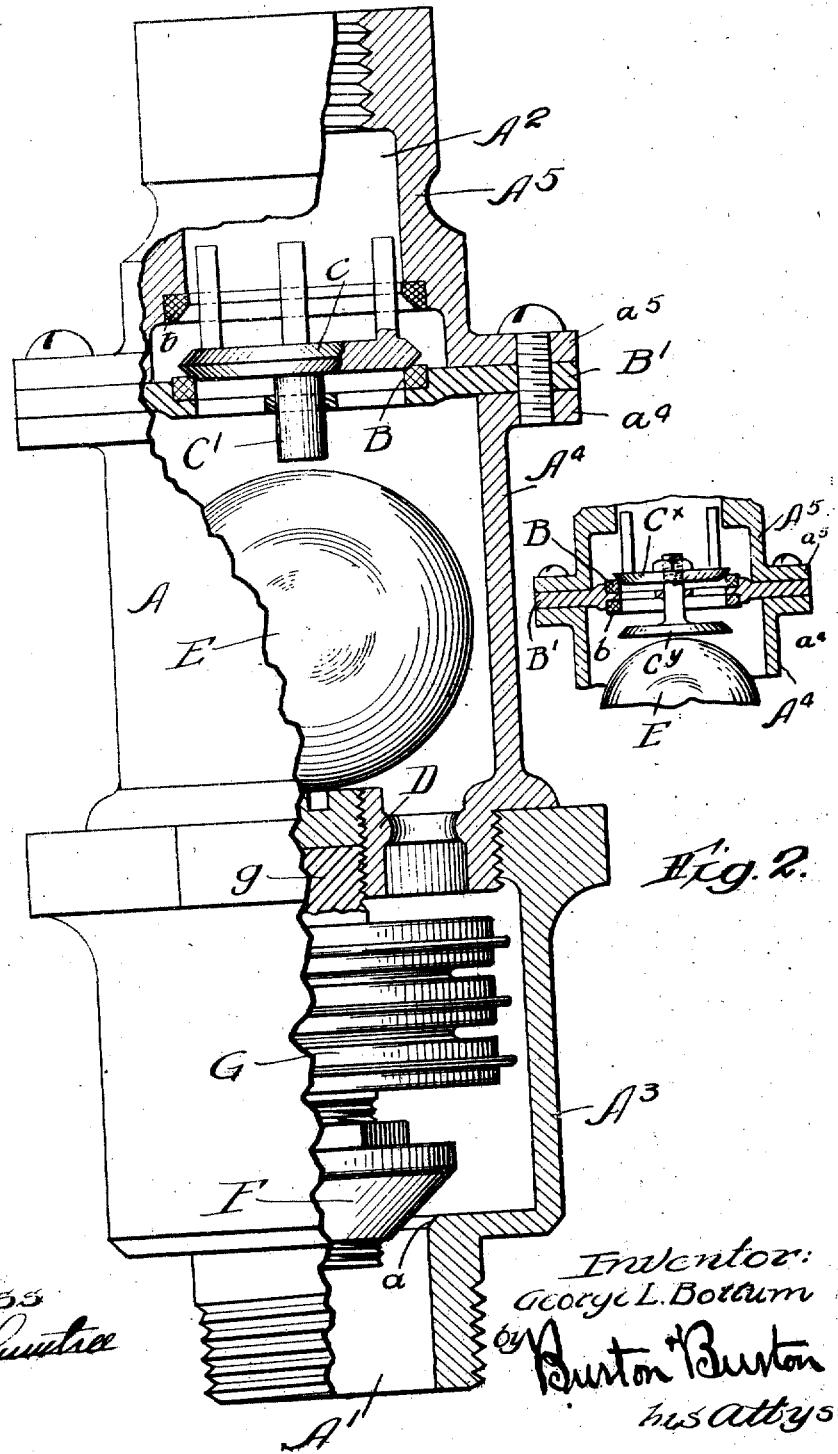

GEORGE L. BOTTUM, OF CHICAGO, ILLINOIS.

COMBINED VALVE DEVICE FOR HOT-WATER HEATING SYSTEMS.

1,213,831.

Specification of Letters Patent.

Patented Jan. 30, 1917.

Application filed March 4, 1916. Serial No. 82,034.

*To all whom it may concern:*

Be it known that I, GEORGE L. BOTTUM, a citizen of the United States, residing at Chicago, in the county of Cook and State of Illinois, have invented new and useful Improvements in Combined Valve Devices for Hot-Water Heating Systems, of which the following is a specification, reference being had to the accompanying drawings, forming a part thereof.

The purpose of this invention is to provide an improved valvular device for relieving the return pipes of a hot water system of air and preventing the intake of air thereinto and the escape of water through the air vent.

A further purpose is to provide a unitary device for accomplishing the purpose above stated and at the same time preventing the escape of steam through the air vent.

It consists in the elements and features of construction shown and described as indicated in the claims.

In the drawings: Figure 1 is a sectional side elevation of a device embodying this invention, section being made axially with respect to the several valves. Fig. 2 is a detail section axial with respect to the air vent and back check valve device, showing the latter in a modified form.

The device as a whole comprises a valve body or casing, A, composed of several members as will hereinafter be more specifically described for convenience of assembling, said casing having an inlet at $A^1$ and an outlet at $A^2$, and a continuous passage from the inlet to the outlet, and having located toward the outlet end two valve seats, $b$ and B, the former facing away from the outlet and the latter facing toward the outlet, and a valvular device, C, which in the form shown in Fig. 1, is a double faced valve positioned between the two seats, $b$ and B, for seating thereupon respectively by movement in opposite directions. In the passage below said valve seats there is contained, and retained by an apertured diaphragm or spider, D, a hollow ball or float, E, which normally in the absence of liquid in said passage, rests upon said spider while the valve, C, rests by gravity upon its lower seat, B; but when said passage becomes occupied by water, the float being lifted thereby, encounters the valve, C, which for that purpose has a stem or projection, $C^1$, extending down through its lower seat so as to be nearly in contact with the ball when the latter rests upon the spider, and when the liquid has risen to a pre-determined height in said passage, the valve, C, is lifted by the float up against its upper seat, $b$, and there remains until the water subsides. It will be observed that in the lower position of the valve, C, resting upon the valve seat, B, air which may enter at the inlet end of the device from the water in the return pipes of the system, will pass by the float and will escape past the valve, C, whose weight resting upon its seat is not sufficient to prevent such escape of air, very slight pressure being adequate to force the way, and will pass out freely through the outlet; but if water follows the air, occupying the passage and lifting the float, before the water reaches the level of the lower valve seat, B, the valve will be forced against its upper seat, $b$, closing the passage against the escape of the water, and any further rise of the water will only operate to force the valve more firmly to its seat. On the other hand, if by recession of the water in the system, there should be induced a back-flow of air tending to come in through the outlet, the valve, C, resting upon its lower seat, will operate as an effectual check valve to prevent such air inflow.

At the same point in the hot water system at which a device for the purpose of that above described is needed, it is desirable and substantially necessary to provide means to prevent the escape of steam in any case in which the water becomes heated to a temperature for generating steam, and it is important that the elements necessary for the purposes above described, and the elements necessary for this last mentioned purpose of preventing the escape of steam, should be combined in a unitary device of which the parts provided for the several purposes shall coöperate and not interfere with each other nor require separate attachment to the system. For this purpose there is provided at the inlet, $A^1$, a valve seat, $a^1$, and in the passage above said seat there is suspended from the apertured diaphragm or spider, D, a valve, F, adapted to seat downwardly upon the valve seat, $a$, the suspending device being a heat-responsive expansible member, G, adapted to be expanded by change of temperature from the normal temperature of the water in the return pipe of the system to the temperature of steam, sufficiently to lower the valve from an elevated position at which the port through the seat, $a$, is sufficiently open for all purposes, to a position seating on said seat. The expansible member, G, may be any form of device adapted to afford the necessary amount of movement by its expansion under the change of temperature indicated. Preferably it is of the form shown in the drawings consisting in a plurality of flat disk-like chambers having their cavities inter-communicating through flexible diaphragms or heads of said chambers, the chambers being filled with some suitable liquid adapted to expand under the change of temperature to the necessary extent. The particular structure of this element may be readily understood from the exterior form as shown in the drawings without illustration of the interior construction which is, however, substantially as shown in my Patent No. 1,147,297, July 20, 1915.

For convenience in constructing and assembling the device, the body, A, comprises four parts rigidly connected together; to-wit: the lower part or member, $A^3$, having the inlet, $A^1$, and the valve seat $a$; the middle part, $A^4$, which is provided at its lower end with the apertured diaphragm or spider, D, for checking the float, E, and which is at that end screwed into the upper end of the part, $A^3$, the upper part, $A^5$, which has the outlet, $A^2$, and the upper valve seat, $b$, and lastly, the centrally apertured diaphragm or annular part, $B^1$, which has the upwardly facing valve seat, B, and which is bound between the flanges, $a^4$ and $a^5$, of the parts, $A^4$ and $A^5$, respectively. This construction permits the ready assembling of the parts so that the double faced valve, C, may be positioned between its two seats, $b$ and B. In this construction the heat-responsive or thermostatic member, G, is suspended from the apertured diaphragm or spider, F, by means of the threaded stem, $g$, protruding from the upper diaphragm or head of said member, G, and screwed into a threaded central aperture of the spider. It will be obvious that instead of the double faced valve, C, located between its two seats, there may be a double faced seat, and a valve having two members between which the seat is positioned. Such construction is shown in Fig. 2, the two valve members, $C^x$ and $C^y$, constituting together a single double-faced valve in effect. In this construction the diaphragm or annular member, $B^1$, carries both the valve seats which are indicated by the same letters which are employed to indicate them in Fig. 1, B being the upwardly-facing valve seat, on which the valve seats for preventing back-flow or in-flow of air, and $b$ being the downwardly-facing valve seat upon which the valve seats upwardly for preventing the escape of water.

I claim:—

1. The combination in a single unitary fitting comprising a valve casing or body having a sole inlet at the lower part and an outlet at the upper part and a continuous passage from the inlet to the outlet, of a valve at the upper part seating upwardly for preventing liquid outflow; an apertured diaphragm or spider below said valve and a float retained by said spider below the valve in position for uplifting the valve to its seat upon rise of liquid in the passage to a pre-determined height; a valve suspended from the spider and a seat for said valve at the inlet, the suspending means being heat-responsive or thermostatic member adapted to expand for lowering the valve to its seat upon rise of temperature to a given degree above the normal, and to contract for lifting the valve from its seat upon fall of temperature from that point.

2. The combination in a single unitary fitting comprising a valve casing or body having an inlet at the lower part and an air outlet at the upper part and a continuous passage from the inlet to the outlet, of a check valve located toward the outlet end seating downward for preventing back-flow of air through said outlet; a valve constituting the sole control of the inlet port and seating outwardly thereat; an apertured diaphragm or spider intermediate the two valves, said inlet valve being suspended from said spider, the suspending means consisting of a heat-responsive or thermostatic member adapted to expand for lowering the valve to its seat upon a pre-determined rise of temperature above the normal.

In testimony whereof I have hereunto set my hand at Chicago, Illinois, this 2nd day of March, 1916.

GEORGE L. BOTTUM.